United States Patent
Eckl et al.

(10) Patent No.: US 11,085,311 B2
(45) Date of Patent: Aug. 10, 2021

(54) TURBOCHARGER WITH TWIN-SCROLL TURBINE HOUSING AND TWIN VANED NOZZLE RING FOR DIRECTING EXHAUST GASES FROM EACH SCROLL ONTO TURBINE WHEEL IN INTERLEAVED FASHION

(71) Applicant: Garrett Transportation I Inc., Torrance, CA (US)

(72) Inventors: Filip Eckl, Dolni Kounice (CZ); Petr Skara, Prague (CZ); Petr Pribyl, Zdar nad Sazavou (CZ)

(73) Assignee: Garrett Transportation I Inc., Torrance, CA (US)

( * ) Notice: Subject to any disclaimer, the term of this patent is extended or adjusted under 35 U.S.C. 154(b) by 22 days.

(21) Appl. No.: 16/351,470

(22) Filed: Mar. 12, 2019

(65) Prior Publication Data

US 2020/0291800 A1    Sep. 17, 2020

(51) Int. Cl.

| | | |
|---|---|---|
| *F01D 9/02* | (2006.01) | |
| *F01D 9/04* | (2006.01) | |
| *F02B 33/40* | (2006.01) | |
| *F02B 37/02* | (2006.01) | |
| *F01D 17/16* | (2006.01) | |

(52) U.S. Cl.
CPC ............ *F01D 9/026* (2013.01); *F01D 9/041* (2013.01); *F02B 33/40* (2013.01); *F01D 17/165* (2013.01); *F02B 37/025* (2013.01); *F05D 2220/40* (2013.01); *F05D 2240/12* (2013.01)

(58) Field of Classification Search
CPC ........ F01D 9/026; F01D 9/045; F01D 17/165; F02B 37/025; F02B 37/22; F02B 37/24; F02C 6/12; F05D 2220/40; F05D 2240/128
See application file for complete search history.

(56) References Cited

U.S. PATENT DOCUMENTS

| | | | |
|---|---|---|---|
| 4,027,994 A | 6/1977 | MacInnes | |
| 5,092,126 A | 3/1992 | Yano | |

(Continued)

FOREIGN PATENT DOCUMENTS

| | | |
|---|---|---|
| JP | 2012219640 A | 11/2012 |
| WO | 2014109883 A1 | 7/2014 |

OTHER PUBLICATIONS

Extended European Search Report for EP Application No. 20153207.4-1004, dated May 27, 2020.

*Primary Examiner* — Woody A Lee, Jr.
*Assistant Examiner* — Behnoush Haghighian
(74) *Attorney, Agent, or Firm* — John C. James (57) ABSTRACT

A turbocharger has a turbine housing scroll that is meridionally divided into first and second scrolls. A nozzle ring disposed in the turbine nozzle has an array of circumferentially spaced first vanes and an array of circumferentially spaced second vanes. The first vane passages between first vanes are configured to blow exhaust gas onto the turbine blade leading edges. Likewise, the second vane passages are configured to blow exhaust gas on the turbine blade leading edges. The first and second vanes are circumferentially staggered relative to each other such that the turbine blade leading edges receive exhaust gas from the first and second blade passages in interleaved fashion about a circumference of the turbine wheel.

9 Claims, 7 Drawing Sheets

(56) References Cited

U.S. PATENT DOCUMENTS

| | | | |
|---|---|---|---|
| 6,260,358 B1 | 7/2001 | Daudel et al. | |
| 6,726,447 B2* | 4/2004 | Lutz | F01D 17/143 |
| | | | 415/158 |
| 7,828,517 B2 | 11/2010 | Serres | |
| 8,123,470 B2* | 2/2012 | Serres | F01D 17/141 |
| | | | 415/158 |
| 8,128,356 B2* | 3/2012 | Higashimori | F01D 17/148 |
| | | | 415/205 |
| 8,424,304 B2* | 4/2013 | Serres | F01D 17/105 |
| | | | 60/600 |
| 8,590,305 B2 | 11/2013 | Anschel et al. | |
| 8,857,178 B2* | 10/2014 | O'Hara | F01D 9/026 |
| | | | 29/889.2 |
| 9,157,396 B2* | 10/2015 | Lusardi | F01D 9/026 |
| 9,347,367 B2* | 5/2016 | Nasir | F02B 37/025 |
| 9,562,442 B2* | 2/2017 | Yoshida | F01D 9/026 |
| 9,771,942 B2* | 9/2017 | Faeth | F01D 17/14 |
| 9,995,158 B2* | 6/2018 | Henderson | F01D 17/105 |
| 10,240,478 B2* | 3/2019 | Mart | F01D 17/143 |
| 2003/0026692 A1* | 2/2003 | Lutz | F01D 17/143 |
| | | | 415/158 |
| 2007/0180826 A1 | 8/2007 | Sumser et al. | |
| 2007/0209361 A1* | 9/2007 | Pedersen | F02B 37/025 |
| | | | 60/602 |
| 2009/0041577 A1* | 2/2009 | Serres | F01D 9/026 |
| | | | 415/159 |
| 2009/0290980 A1 | 11/2009 | Higashimori | |
| 2011/0194929 A1 | 8/2011 | Denholm et al. | |
| 2012/0023936 A1* | 2/2012 | Kruiswyk | F01D 9/045 |
| | | | 60/605.2 |
| 2013/0000300 A1* | 1/2013 | O'Hara | F01D 9/026 |
| | | | 60/605.2 |
| 2013/0121820 A1* | 5/2013 | Yoshida | F01D 25/24 |
| | | | 415/205 |
| 2014/0294577 A1* | 10/2014 | Yoshida | F04D 29/403 |
| | | | 415/204 |
| 2014/0338328 A1* | 11/2014 | Lusardi | F01D 9/045 |
| | | | 60/605.2 |
| 2015/0013332 A1 | 1/2015 | Nasir et al. | |
| 2015/0093236 A1* | 4/2015 | Faeth | F01D 17/14 |
| | | | 415/148 |
| 2015/0345316 A1* | 12/2015 | Henderson | F01D 9/026 |
| | | | 415/204 |
| 2016/0298471 A1* | 10/2016 | Uhlenhake | F01D 25/24 |
| 2018/0328281 A1* | 11/2018 | Eckl | F02C 6/12 |

* cited by examiner

TURBOCHARGER WITH TWIN-SCROLL TURBINE HOUSING AND TWIN VANED NOZZLE RING FOR DIRECTING EXHAUST GASES FROM EACH SCROLL ONTO TURBINE WHEEL IN INTERLEAVED FASHION

BACKGROUND OF THE INVENTION

The present disclosure relates to turbochargers in which a turbine of the turbocharger is driven by exhaust gas from a reciprocating engine. The invention relates more particularly to turbine housings that are divided into a plurality of substantially separate sections each fed by a separate exhaust system.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically, the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

In multiple-piston reciprocating engines, it is known to design the exhaust system in such a manner as to take advantage of the pressure pulsation that occurs in the exhaust stream. In particular, it is known to employ what is known as "pulse separation" wherein the cylinders of the engine are divided into a plurality of groups, and the pulses from each group of cylinders are substantially isolated from those of the other groups by having independent exhaust passages for each group. To take best advantage of pulse separation, it is desired to minimize the communication or "cross talk" between the separate groups of cylinders. Accordingly, in the case of a turbocharged engine, it is advantageous to maintain separate exhaust passages all the way into the turbine of the turbocharger. Thus, the turbine housing into which the exhaust gases are fed is typically divided into a plurality of substantially separate parts.

There are two basic ways in which turbine housings have been divided: (1) sector division, and (2) meridional division. In a sector-divided turbine housing, the generally annular chamber is divided into angular sectors each of which occupies only a part of the circumference such that the passages succeed each other in the circumferential direction, such as shown in FIG. 2 of U.S. Pat. No. 6,260,358. Sector division of the turbine housing is advantageous from a flow-separation point of view, but the out-of-phase exhaust gas pulses from the two sectors can induce unwanted turbocharger shaft motion.

In a meridionally divided turbine housing, the scroll or chamber that surrounds the turbine wheel and into which the exhaust gases are fed is divided into a plurality of scrolls that succeed one another in the axial direction, each scroll occupying substantially a full circumference, such as shown in FIG. 4 of U.S. Pat. No. 4,027,994. Meridional division of the turbine housing is advantageous from a shaft motion point of view, but the exhaust gas flow from each scroll impinges on less than the full axial width of the turbine blade leading edges, which negatively affects turbine efficiency because of mixing losses.

The present disclosure relates to turbochargers having turbine housings of the meridionally divided type.

BRIEF SUMMARY OF THE DISCLOSURE

The present disclosure describes embodiments of a turbocharger having a meridionally divided scroll, but in which each scroll blows exhaust gas on the full axial width of the turbine wheel.

In accordance with an embodiment of the invention described and illustrated herein, a turbocharger comprises:

a compressor wheel mounted within a compressor housing;

a turbine wheel mounted within a turbine housing;

the turbine housing defining a meridionally divided scroll comprising first and second scrolls for respectively receiving separate streams of exhaust gas, each of the first and second scrolls extending about substantially a full circumference of the turbine housing, the second scroll succeeding the first scroll in an axial direction of the turbocharger;

the turbine housing defining a nozzle for leading exhaust gas from the meridionally divided volute onto the turbine wheel;

the turbine wheel comprising a hub and a plurality of turbine blades joined to the hub, each turbine blade defining a blade leading edge; and a nozzle ring disposed in the nozzle, the nozzle ring comprising a first ring of first vanes circumferentially spaced about a circumference of the nozzle ring and a second ring of second vanes circumferentially spaced about the circumference of the nozzle ring, the first ring defining first vane passages between circumferentially successive first vanes, the second ring defining second vane passages between circumferentially successive second vanes, wherein the first vane passages are positioned to receive exhaust gas from only the first scroll and wherein respective exits from the first vane passages direct a plurality of first exhaust gas jets on the turbine blade leading edges, wherein the second vane passages are positioned to receive exhaust gas from only the second scroll and wherein respective exits from the second vane passages direct a plurality of second exhaust gas jets on the turbine blade leading edges, and wherein the first vane passages are circumferentially staggered relative to the second vane passages such that about a circumference of the turbine wheel, the first exhaust gas jets are interleaved with the second exhaust gas jets.

Because each of the two scrolls blows exhaust gas on the turbine wheel all the way around its circumference, and the jets from the first and second vane passages are interleaved about the circumference, the invention can mitigate the shaft motion and mixing-loss issues that can affect some prior-art turbines of the sector-divided and meridionally divided types. The invention can maintain good flow isolation between the two streams of exhaust gas all the way to the turbine wheel, thereby taking full advantage of utilization and separation of exhaust manifold pressure pulses.

In some embodiments, there can be symmetry between the first and second vane passages in terms of them having substantially equal respective flow areas. In other embodiments, however, the flow area of the first vane passages can differ from the flow area of the second vane passages so that one scroll contributes a greater fraction of the total exhaust gas flow than does the other scroll, while at the same time the volumes of the first and second scrolls optionally can be equal.

In some embodiments, the first vane passages can be configured so that each first exhaust gas jet impinges on a full extent of the turbine blade leading edges, and similarly the second vane passages can be configured so that each second exhaust gas jet impinges on the full extent of the turbine blade leading edges. In other embodiments, each of the first and second vane passages can be configured so that the first as well as the second exhaust gas jets impinge on less than the full extent of the leading edges.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. References herein to "radial", "circumferential", and "axial" (or equivalently, to the cylindrical coordinates r, θ, z respectively) are with respect to the turbocharger rotational axis, the axial direction being along or parallel to the rotational axis, the radial direction extending perpendicularly from the rotational axis, and the circumferential direction being about the rotational axis.

Figure 1:
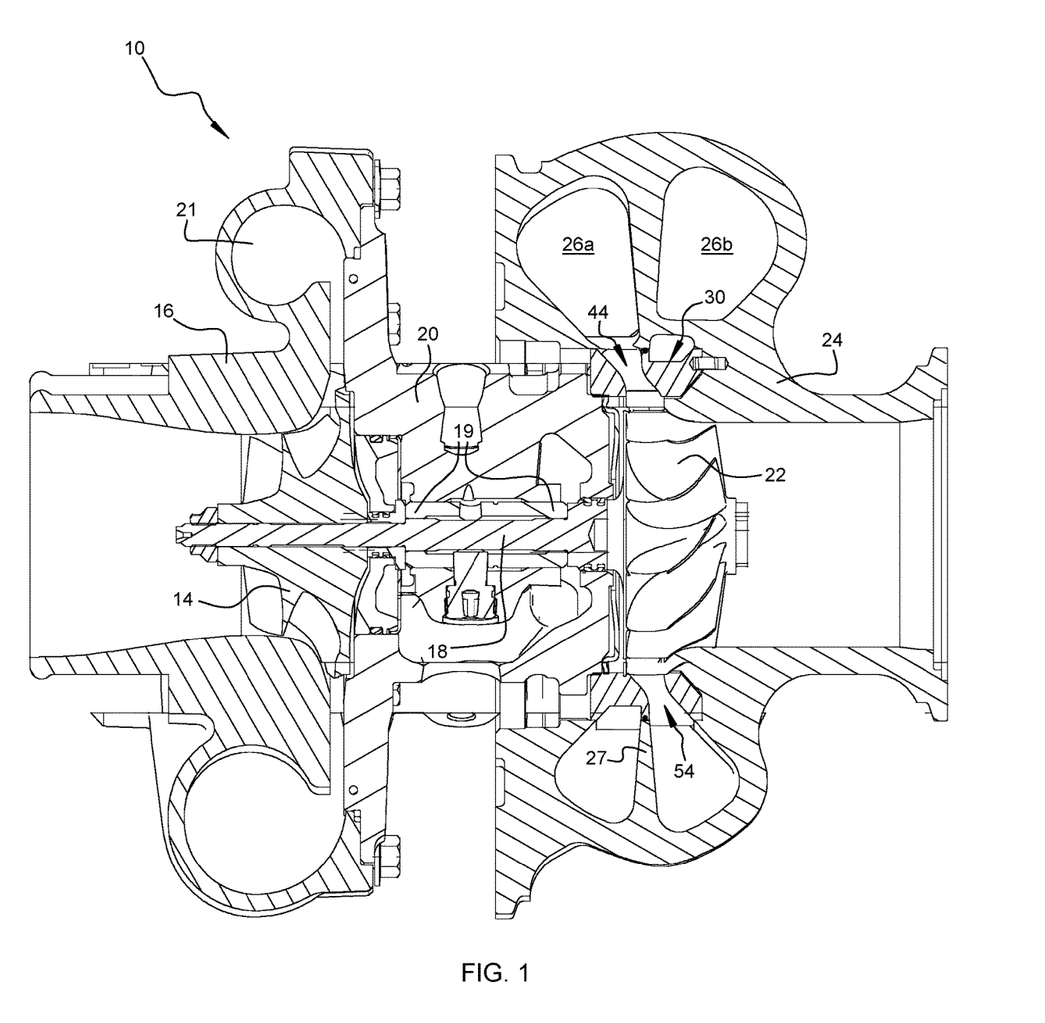
FIG. 1 is an axial cross-sectional view of a turbocharger in accordance with an embodiment of the invention.

A turbocharger 10 in accordance with one embodiment of the present invention is shown in FIG. 1. The turbocharger includes a compressor wheel or impeller 14 disposed in a compressor housing 16 and mounted on one end of a rotatable shaft 18. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to a volute 21, which collects the compressed air for supply to the intake of an internal combustion engine (not shown) for boosting the performance of the engine.

The turbocharger also includes a turbine housing 24 that houses the turbine wheel 22. As previously noted, in reciprocating internal combustion engines having a plurality of cylinders, it is advantageous to design the exhaust system in such a manner as to take advantage of the pressure pulsation that occurs in the exhaust streams discharged from the cylinders. In particular, it is advantageous to employ what is known as "pulse separation" wherein the cylinders of the engine are divided into a plurality of groups, and the pulses from each group of cylinders are substantially isolated from those of the other groups by having independent exhaust passages for each group. To take best advantage of pulse separation, it is desired to minimize the communication or "cross talk" between the separate groups of cylinders. In the case of a turbocharged engine, it is advantageous to maintain separate exhaust passages all the way into the turbine of the turbocharger. To this end, the turbine housing typically has a divided scroll, comprising two separate scrolls that respectively receive separate streams of exhaust gas.

Thus, as shown in FIG. 1, the turbine housing 24 defines a meridionally divided scroll comprising a first scroll 26a and a second scroll 26b, which are separated from each other by a divider wall 27. The second scroll succeeds the first scroll in the axial direction of the turbocharger, and each scroll receives exhaust gas via a separate exhaust gas inlet defined by the turbine housing. In accordance with the invention, the two streams of exhaust gas are isolated from each other all the way to the turbine wheel 22, via a nozzle ring 30 that separately directs the two streams of exhaust gas onto the turbine wheel. The nozzle ring is disposed within the turbine housing 24 adjacent to the center housing 20.

With reference to FIGS. 2-8, the nozzle ring 30 defines a first ring 40 of first vanes 42 circumferentially spaced about a circumference of the nozzle ring, and a second ring 50 of second vanes 52 circumferentially spaced about the circumference of the nozzle ring. The first ring 40 defines first vane passages 44 between circumferentially successive first vanes 42. Similarly, the second ring 50 defines second vane passages 54 between circumferentially successive second vanes 52. The first vane passages 44 are circumferentially staggered relative to the second vane passages 54. Stated differently, the array of second vanes is "clocked" circumferentially about the nozzle ring axis relative to the array of first vanes, by an angular amount that is less than an angular spacing between adjacent first vanes. In the illustrated embodiment, the second vane passages are circumferentially staggered from the first vane passages by approximately half of a circumferential spacing between the leading edge of one first vane 42 and the leading edge of the next first vane 42 in the circumferential direction. Fluid isolation of the two sets of vane passages 44 and 54 is accomplished by a partition 48 comprising a generally annular wall, wherein ends of the first vanes 42 are joined to one face of the partition 48 and ends of the second vanes 52 are joined to the opposite face of the partition.

Figure 2:
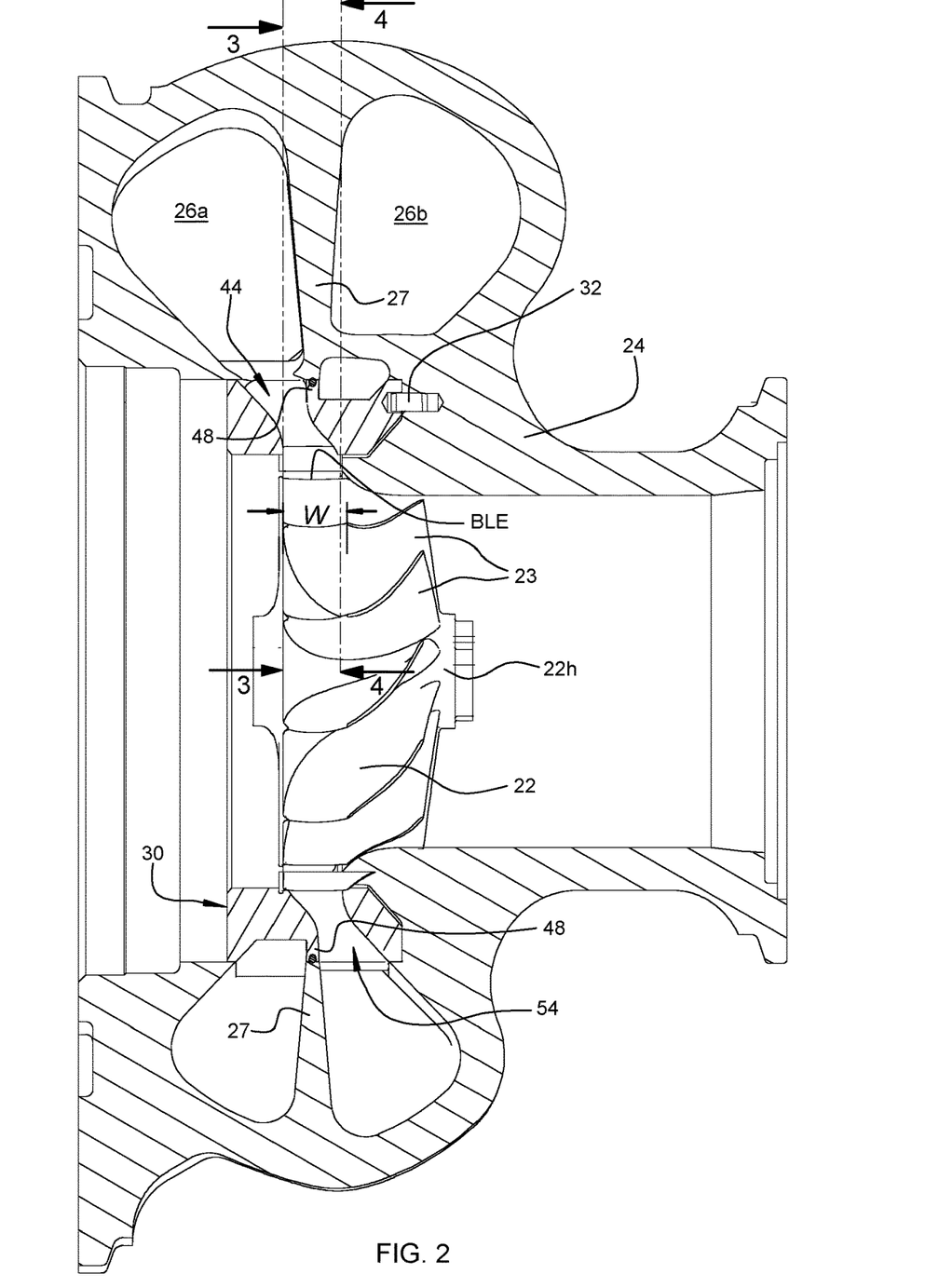
FIG. 2 is an axial cross-sectional view of the turbine housing, turbine wheel, and nozzle ring in accordance with an embodiment of the invention.
Figure 3:
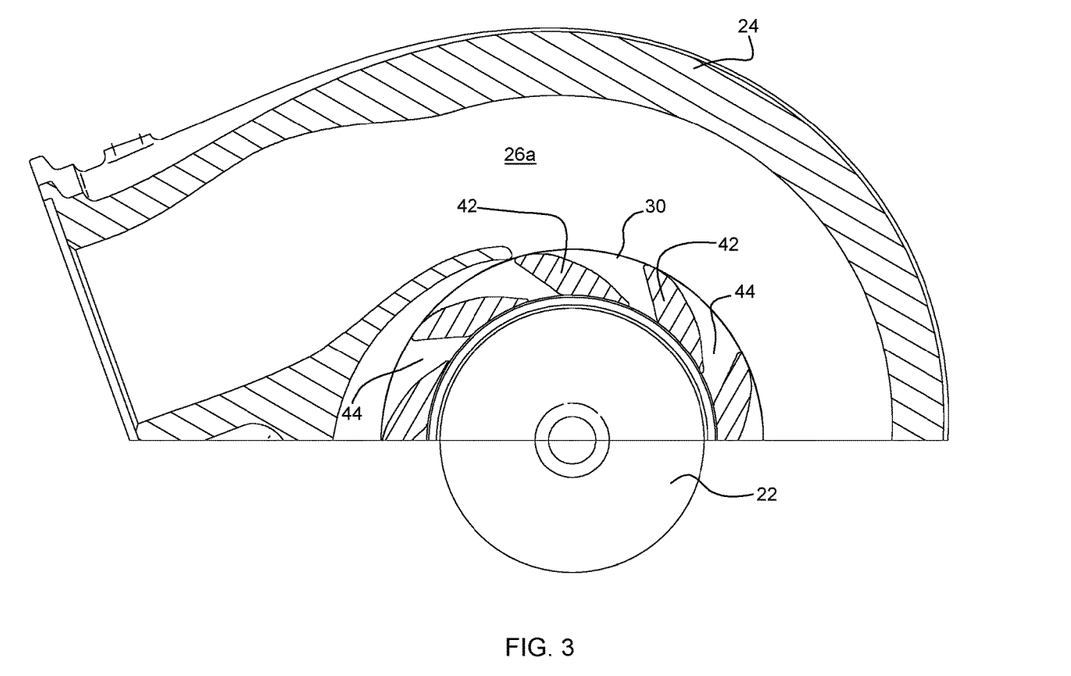
FIG. 3 is a cross-sectional view along line 3-3 in FIG. 2.
Figure 4:
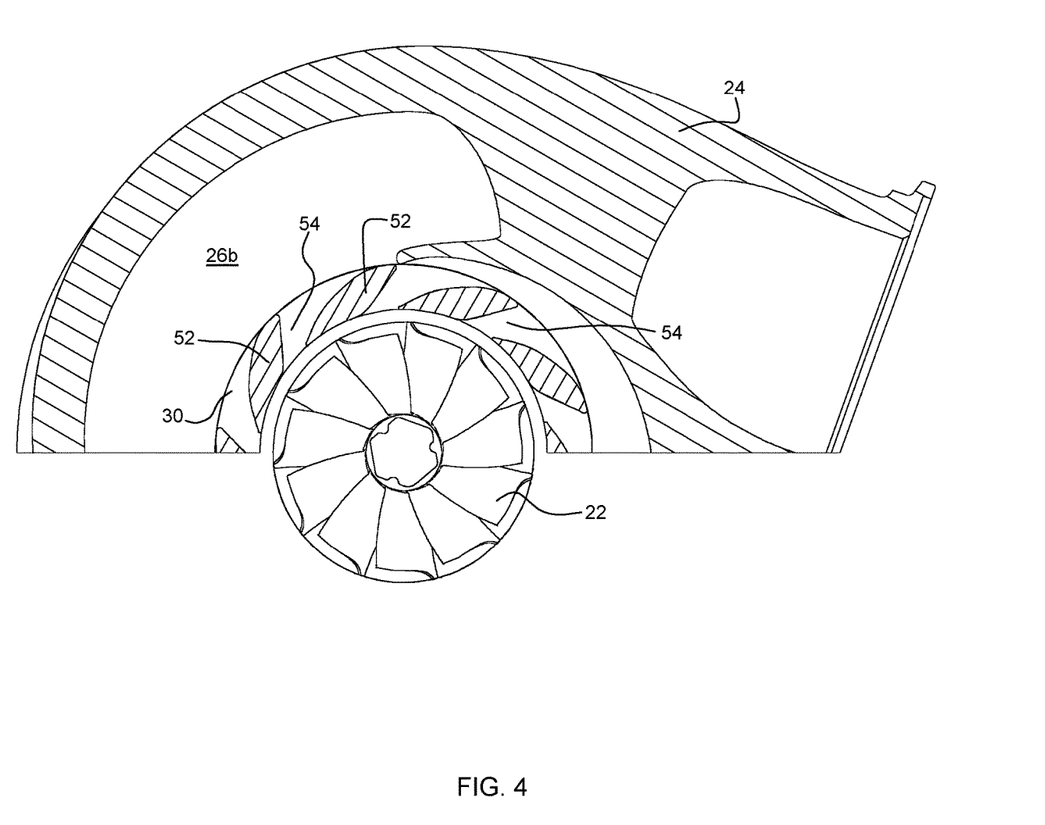
FIG. 4 is a cross-sectional view along line 4-4 in FIG. 2.

The nozzle ring 30 can include a first end wall 46 and a second end wall 56. The first end wall 46 is axially spaced from the partition 48, and the opposite ends of the first vanes 42 from the partition are joined to the first end wall. The second end wall 56 is axially spaced on the other side of the partition, and the opposite ends of the second vanes 52 from the partition are joined to the second end wall. To prevent the nozzle ring from rotating relative to the turbine housing 24, the nozzle ring can be provided with an anti-rotation feature, or a plurality of such features. In one non-limiting embodiment, the anti-rotation feature can comprise one or more pins 32. The nozzle ring can define receptacles 58 in the second end wall 56 (or alternatively in the first end wall 46), which align with corresponding receptacle(s) in the turbine housing 24, and each pair of aligned receptacles are kept in alignment by one of said anti-rotation pins 32 (FIG. 2). In the illustrated embodiment, there are three such anti-rotation pins circumferentially spaced about the circumference of the nozzle ring. Other types of anti-rotation features are possible in the practice of the invention, examples of which include but are not limited to radially oriented pins engaged in holes or slots in the turbine housing, integral features such as protuberances formed on the nozzle ring for engaging corresponding slots or notches in the turbine housing, and the like.

The radially innermost extremity of the divider wall 27 of the turbine housing 24 is adjacent to a radially outer periphery of the nozzle ring 30 as best seen in FIG. 2. The interface between the divider wall and the nozzle ring can be sealed with a seal (e.g., an O-ring or any other suitable type of seal). Alternatively, however, it may be desired in a particular case to have a defined clearance between the divider wall and the nozzle ring, the size of the clearance being selected so as to regulate the degree of fluid isolation between the two exhaust gas streams.

Figures 5, 6:
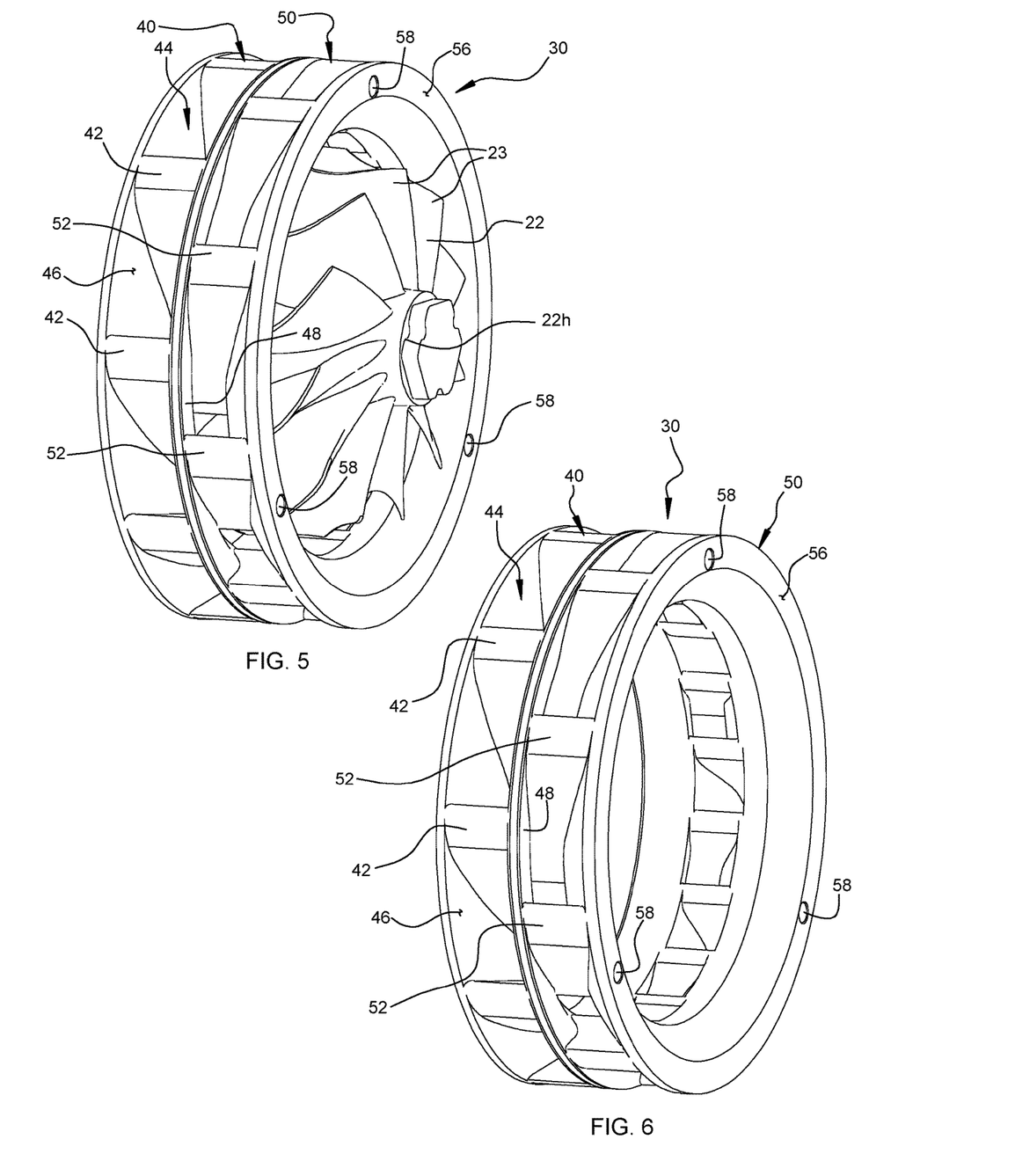
FIG. 5 is an isometric view of the nozzle ring and turbine wheel in accordance with an embodiment of the invention.
FIG. 6 is a view similar to that of FIG. 5, but with the turbine wheel removed.
Figures 7, 8:
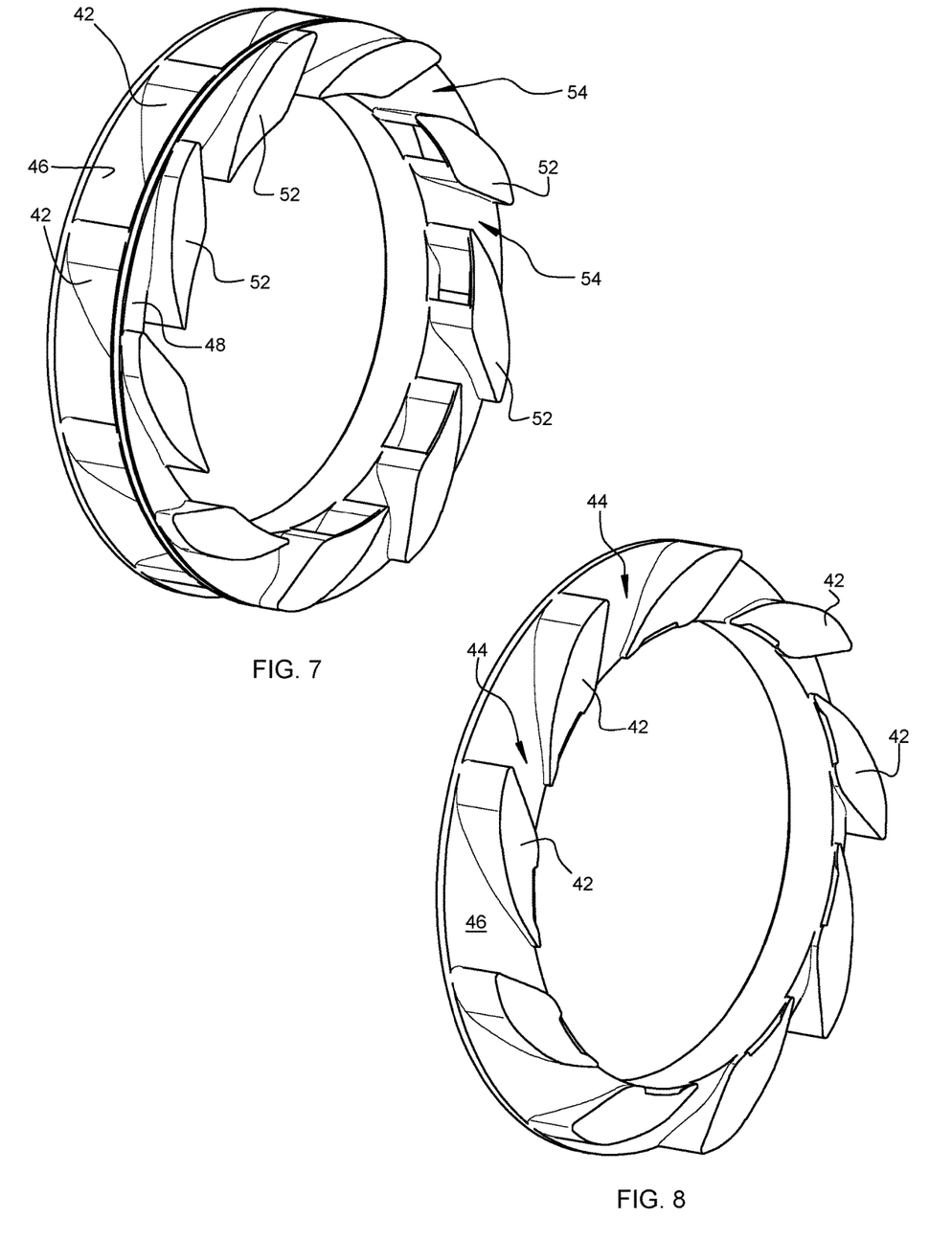
FIG. 7 is a view similar to FIG. 6, but wherein the nozzle ring has been sectioned along an r-θ plane (i.e., a constant-z plane) through the second ring.
FIG. 8 is similar to FIG. 7, the nozzle ring having been sectioned along an r-θ plane through the first ring.

As best seen in FIGS. 2 and 5, the turbine wheel 22 includes a hub 22h to which a plurality of turbine blades 23 are affixed. Each turbine blade 23 has a blade leading edge BLE. The blade leading edges are the first part of the blades to be impinged by the exhaust gas jets spouted from the vane passages 44 and 54. As shown in FIG. 2, the first vane passages 44 are positioned to receive exhaust gas from only the first scroll 26a and an exit from each first vane passage 44 directs a first exhaust gas jet onto the turbine blade leading edges BLE. Similarly, the second vane passages 54 are positioned to receive exhaust gas from only the second scroll 26b and an exit from each second vane passage 54 directs a second exhaust gas jet onto the turbine blade leading edges. In the illustrated embodiment, each of the first and second exhaust gas jets impinges on the full width W of the turbine blade leading edges.

Figure 9:
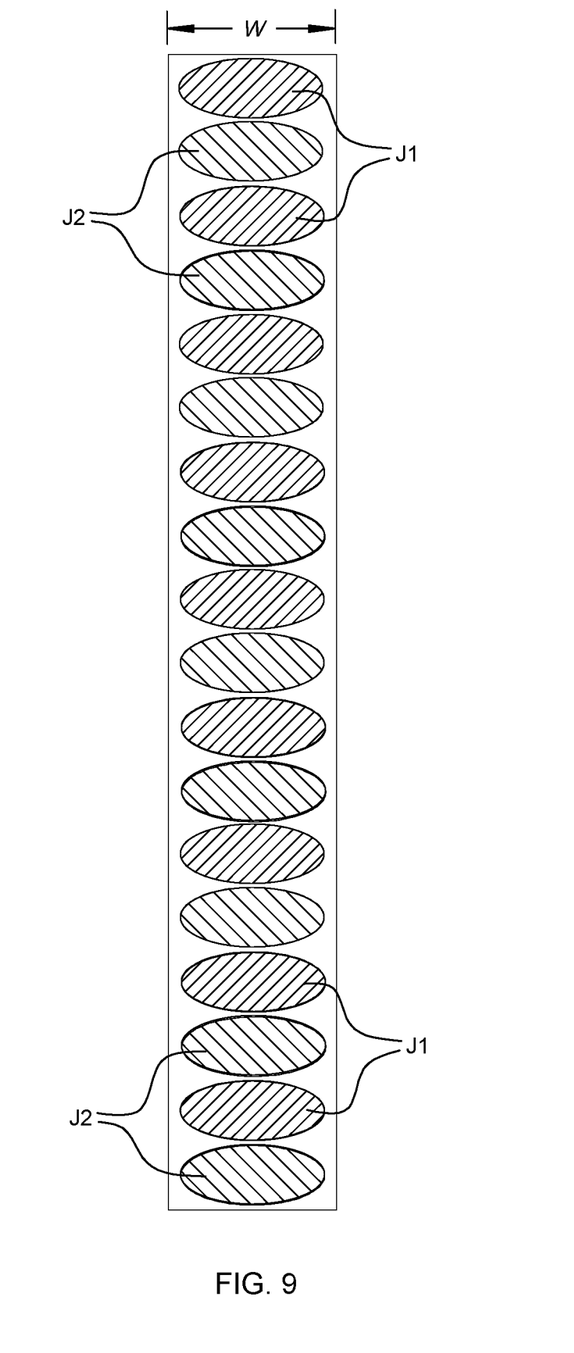
FIG. 9 is a diagrammatic view of the leading-edge portion of the turbine wheel in an unwrapped view, illustrating interleaved first and second exhaust gas jets.

With reference to FIG. 9, because of the circumferential offset between the two sets of vanes 42 and 52, the turbine blade leading edges BLE receive the first and second exhaust gas jets, J1 and J2, respectively, from the first and second blade passages 44 and 54 in interleaved fashion about a circumference of the turbine wheel. That is, one circumferential sector of the wheel receives a first exhaust gas jet J1 from a first vane passage, an adjacent circumferential sector receives a second exhaust gas jet J2 from a second vane passage, the next circumferential sector receives a first exhaust gas jet J1 from the next adjacent first vane passage, and so forth in alternating or interleaved fashion about the entire circumference of the wheel.

As previously noted, the nozzle ring in accordance with embodiments of the invention is able to mitigate some of the drawbacks of both meridionally divided and sector-divided turbine housing designs according to the prior art. With respect to sector-divided turbine housings, the out-of-phase pulses directed against the turbine wheel from the two 180-degree sectors can induce undesired turbocharger shaft motion. In contrast, the nozzle ring of the invention distributes the out-of-phase pulses evenly about the turbine wheel circumference, thereby tending to reduce or eliminate such excessive shaft motion. With respect to meridionally divided turbine housings, because each scroll feeds exhaust gas to only about half of the width of the turbine blade leading edges, substantial mixing losses can occur, adversely affecting turbine efficiency. The nozzle ring according to embodiments of the invention can mitigate both the shaft-motion issue and the mixing-loss issue because the two scrolls feed exhaust gas alternately (i.e., in interleaved fashion) about the entire circumference (and in some embodiments can also blow exhaust gas on the full extent of the turbine blade leading edges).

The invention provides the ability to control the flow split between the two scrolls. For example, an uneven or asymmetric flow split can be achieved by sizing the vane passages for one scroll smaller than the vane passages for the other scroll. In such case, it may be advantageous for the scrolls to be of equal volume.

The shapes of the entrance and exit sides of the vane passages 44 and 54 can be selected by the designer. In some embodiments, the vane passage exits can be generally rectangular; in other embodiments they can be oval. The entrance of a given vane passage does not necessarily have to have a shape like that of the exit of the passage. For example, a vane passage entrance can be rectangular and the exit can be round or oval, or vice versa. In the case noted above in which the vane passages for one scroll are smaller than the vane passages for the other scroll, the shapes of the vane passage exits can differ between the two scrolls. As one non-limiting example, the vane passage exits for one scroll can be rectangular and the vane passage exits for the other scroll can be oval and smaller in flow area than the rectangular exits.

In the illustrated embodiment, the second vane passages 54 are circumferentially staggered relative to the first vane passages 44 such that there is no circumferential overlap between a given second exhaust gas jet J2 and the neighboring first exhaust gas jet J1 (as best seen in FIG. 9). However, the invention is not limited in this sense, and in other (non-illustrated) embodiments the vanes can be configured such that there is some circumferential overlap between the respective first exhaust gas jets J1 and second exhaust gas jets J2. Additionally, in other (non-illustrated) embodiments, each of the first and second vane rings can blow exhaust gas on less than the full width W or extent of the turbine blade leading edges, and in that case there can be overlap in the axial direction (and optionally in the circumferential direction also) between the first exhaust gas jets and the second exhaust gas jets.

In the embodiment of the invention illustrated in FIGS. 5-8, the nozzle ring 30 includes the two end walls 46 and 56. Alternatively, however, the end walls 46 and 56 can be omitted so that the nozzle ring comprises only the partition 48 and the two sets of vanes 42 and 52 joined with the partition. In that case, the function of the end walls can be performed by portions of the turbine housing 24.

Many modifications and other embodiments of the inventions set forth herein will come to mind to one skilled in the art to which these inventions pertain having the benefit of the teachings presented in the foregoing descriptions and the associated drawings. For example, in the illustrated embodiment the turbine is a radial-inflow type, but the invention is also applicable to other turbine types such as mixed-flow and axial-inflow turbines. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger comprising:
a compressor wheel mounted within a compressor housing;
a turbine wheel mounted within a turbine housing;
the turbine housing defining a meridionally divided scroll comprising first and second scrolls for respectively receiving separate streams of exhaust gas, each of the first and second scrolls extending about substantially a full circumference of the turbine housing, the second scroll succeeding the first scroll in an axial direction of the turbocharger;
the turbine housing defining a nozzle for leading exhaust gas from the meridionally divided volute onto the turbine wheel; and
a nozzle ring disposed in the nozzle, the nozzle ring comprising a first ring comprising of first vanes circumferentially spaced about a circumference of the nozzle ring and a second ring comprising second vanes circumferentially spaced about the circumference of the nozzle ring, and a partition disposed axially intermediate the first ring and the second ring, the first vanes of the first ring extending axially between one side of the partition and a first end wall axially spaced from said one side of the partition, the first ring defining first vane passages bounded circumferentially between circumferentially successive first vanes and bounded axially between the first end wall and said one side of the partition, the second vanes of the second ring extending axially between an opposite side of the partition and a second end wall axially spaced from said opposite side of the partition, the second ring defining second vane passages bounded circumferentially between circumferentially successive second vanes and bounded axially between the opposite side of the partition and the second end wall, wherein the first vane passages are positioned to receive exhaust gas from only the first scroll and the second vane passages are positioned to receive exhaust gas from only the second scroll, wherein entrances of the first vane passages are circumferentially staggered relative to entrances of the second vane passages, and exits of the first vane passages are circumferentially staggered relative to exits of the second vane passages, and wherein from the entrance to the exit of each first vane passage the first end wall and the one side of the partition extend radially inwardly and axially toward the second end wall, and from the entrance to the exit of each second vane passage the second end wall and the opposite side of the partition extend radially inwardly and axially toward the first end wall, such that the exits of the first vane passages coincide in axial extent and axial location with the exits of the second vane passages and are circumferentially interleaved with the exits of the second vane passages.

2. The turbocharger of claim 1, wherein the turbine housing comprises a divider wall that separates the first and second scrolls from each other, and wherein a radially inner end of the divider wall is adjacent a radially outer periphery of the nozzle ring.

3. The turbocharger of claim 1, wherein said axial extent and axial location of the exits from the first and second vane passages are such that exhaust gas directed from the first vane passages impinges on a full axial extent of the turbine blade leading edges and exhaust gas from the second vane passages impinges on the full axial extent of the turbine blade leading edges.

4. The turbocharger of claim 1, further comprising an anti-rotation feature to prevent the nozzle ring from rotating relative to the turbine housing.

5. The turbocharger of claim 1, wherein the first scroll and the second scroll have equal volumes.

6. The turbocharger of claim 1, wherein the first scroll and the second scroll have unequal volumes.

7. The turbocharger of claim 1, wherein the first vane passages are equal in flow area to the second vane passages.

8. The turbocharger of claim 1, wherein the first vane passages are unequal in flow area to the second vane passages.

9. The turbocharger of claim 1, wherein the second vane passages are circumferentially staggered from the first vane passages by half of a circumferential spacing between leading edges of the first vanes.

* * * * *